United States Patent [19]

Brindöpke et al.

[11] Patent Number: 4,608,420

[45] Date of Patent: Aug. 26, 1986

[54] PROCESS FOR THE PREPARATION OF ACYLURETHANES, AND THE USE THEREOF

[75] Inventors: Gerhard Brindöpke, Frankfurt am Main; Gerhard Johannes, Taunusstein, both of Fed. Rep. of Germany

[73] Assignee: Hoechst Aktiengesellschaft, Fed. Rep. of Germany

[21] Appl. No.: 741,876

[22] Filed: Jun. 6, 1985

[30] Foreign Application Priority Data

Jun. 8, 1984 [DE] Fed. Rep. of Germany ....... 3421293

[51] Int. Cl.⁴ .............................................. C08F 8/30
[52] U.S. Cl. .................................... 525/375; 525/530; 525/533; 526/301; 526/302; 528/117; 528/322; 560/25; 560/158
[58] Field of Search ................ 526/301, 302; 525/375, 525/530, 533; 528/117, 322; 560/25, 158

[56] References Cited

U.S. PATENT DOCUMENTS 4,160,077 7/1979 Brooks ................................. 560/158
4,160,866 7/1979 Brooks ................................. 560/158
4,163,097 7/1979 Baumann ............................. 528/117

Primary Examiner—Paul R. Michl

Attorney, Agent, or Firm—Bierman, Peroff & Muserlian

[57] ABSTRACT

Process for the preparation of acylurethanes by reacting a urethane with compounds containing hydroxyl groups, which comprises reacting a hydroxy compound (A) with a urethane (B) in the form of an imide of the formula

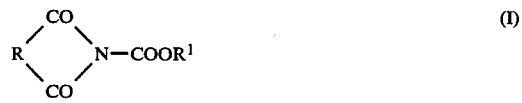

to give an acylurethane containing at least one grouping of the formula $-CO-R-CO-NH-COOR^1$ (II). In these formulae, R denotes the hydrocarbon radical of an optionally $\alpha,\beta$-ethylenically unsaturated, aliphatic, cycloaliphatic or aromatic dicarboxylic acid or endomethylene derivatives thereof, and $R^1$ denotes alkyl, alkoxy, alkoxyalkyl, cycloalkyl or benzyl.

These acylurethanes are suitable for use as self-crosslinking curing agents or as curing agents for polyhydroxy compounds for the production of shaped articles and/or coatings.

14 Claims, No Drawings

PROCESS FOR THE PREPARATION OF ACYLURETHANES, AND THE USE THEREOF

It is known to prepare acylurethanes by reacting carboxylic acid halides with carbamic acid esters (German Pat. No. 1,081,460). These acylurethanes, containing the grouping —CO—NH—COOR wherein R is a hydrocarbon radical, are employed for crosslinking high-molecular compounds containing hydroxyl groups. It is mentioned that the process of acylation is suitable for use in the chemistry of plastics, of textile finishing and of surface coatings, and that the crosslinked resins can be used as ion exchangers. No further details are indicated in this reference in relation to surface coatings; it is merely stated that most of the acylated urethanes described are soluble in the conventional organic solvents, particularly those preferred in the surface coatings industry. However, nothing is stated in the publication concerning the use of the acylated urethanes in powder coating agents and/or pastes, although it is known that, for this field of use, the components are subject to special requirements.

A further publication (German Auslegeschrift No. 2,225,247) describes the reaction of alkyl or phenyl carbamates with acyl or aryl halides of monocarboxylic acids in the presence of a metal or metal compound, for example zinc powder or zinc chloride, with the formation of acylurethanes and the liberation of hydrogen chloride. Nothing is mentioned in the reference concerning the use of the acylurethanes. However, the products thus prepared have the disadvantage of being sparingly soluble or insoluble, so that their use is limited accordingly.

It was therefore desired to prepare acylurethanes by a process which does not cause pollution of the environment and in which products having an extended range of possible uses are obtained.

The present invention avoids the disadvantages of the products known hitherto by providing a process for the preparation of acylurethanes by reacting a urethane with compounds containing hydroxyl groups, which comprises reacting a hydroxy compound (A), preferably a polyhydroxy compound, with a urethane (B) in the form of an imide of the formula

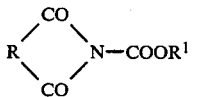   (I)

to give an acylurethane containing at least one grouping of the formula $$-CO-R-CO-NH-COOR^1 \quad (II)$$

R in the above formulae denoting the hydrocarbon radical of an optionally unsaturated, aliphatic, cycloaliphatic or aromatic dicarboxylic acid, or endomethylene derivatives thereof, having 2 to 10, preferably 2 to 6, carbon atoms and $R^1$ denoting alkyl, alkoxy or alkoxyalkyl having in each case 1 to 16, preferably 1 to 10, carbon atoms in the alkyl group, cycloalkyl having 3 to 10 carbon atoms or benzyl.

Opening of the ring of the compound (I) is achieved in the reaction according to the invention. Thus no cleavage products are liberated, on the contrary only an addition reaction of the OH compounds (A) takes place. Therefore, the component (B) can be added on to monomers or to polymers. As a result, diversity is imparted to the process and to the possible uses of the products prepared thereby. Since no harmful products are split off, the process according to the invention proves to be acceptable to the environment.

The component (A) is advantageously reacted in the form of a monohydric, or preferably polyhydric, monomeric and/or oligomeric alcohol or an oligomer and/or polymer of the group comprising polyesters, polyacrylic compounds and polyepoxides.

By virtue of the multiplicity of possible variations in the starting materials, especially the component (A), the products obtained in accordance with the invention can vary within a wide range in respect of their properties and chemical structure, so that they are accessible to a very varied range of possible uses. Surprisingly, it is also possible to prepare, as desired, products having a higher or lower molecular weight or a higher or lower solubility. The products can thus be employed without difficulty either in organic or aqueous solvents or in solvent-free systems.

The acids forming the radical R are maleic acid, tetrahydrophthalic acid and hexahydrophthalic acid, preferably phthalic acid and, especially, succinic acid.

The reaction proceeds in accordance with the following equation:

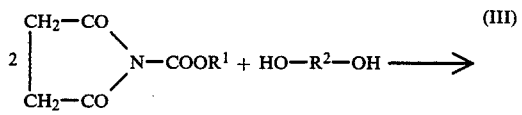   (III)

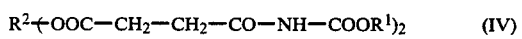   (IV)

in which formulae $R^1$ denotes alkyl having 1 to 12, preferably 1 to 8, carbon atoms and $R^2$ denotes an alkylene radical having 2 to 10 carbon atoms.

Only one diol is shown in the equation as the component (A). It is also possible, however, to employ monohydric alcohols or alcohols of higher functionality, in which case compounds analogous to formula IV, but having a different functionality of $R^2$, are formed.

N-Methoxycarbonylsuccinimide, N-ethoxycarbonylsuccinimide and N-butoxycarbonylsuccinimide and the corresponding hexahydrophthalimides and N-2-methoxyethylcarbonylsuccinimide are mentioned as examples of compounds of the formula III.

Examples of suitable alcohols (component A) containing the radical $R^2$ are monohydric to hexahydric, monomeric and/or oligomeric, consequently predominantly low-molecular, saturated or α, β-ethylenically unsaturated, aliphatic and/or cycloaliphatic alcohols having 2 to 25 carbon atoms and optionally containing ether groups or up to 2 double bonds or a triple bond. The cycloaliphatic alcohols can contain up to 12, in particular up to 6, carbon atoms in the ring system. The following are mentioned as alcohols: methanol, ethanol, propanol, the various butanols, pentanols, hexanols and higher homologs thereof; also ethanediol, the various propanediols, butanediols, pentanediols, hexanediols and octanediols, the corresponding triols, insofar as they exist, for example glycerol, hexane-1,2,6-triol, trimethylolethane and trimethylolpropane; neopentylglycol, pentaerythritol and dipentaerythritol; dicyclohexanediols or dicyclohexanetriols, for example dimethylolcyclohexane; mannitol, sorbitol and the oligomers of the diols mentioned, for example diethylene, triethylene and tetraethylene glycol and the analogous propanediol and butanediol derivatives and higher homologs thereof; and also castor oil, in each case on their own or as a mixture. The polyhydric alcohols are preferred.

Examples of suitable components (A) in the form of OH compounds having a higher-molecular structure are oligomers and/or polymers of the group comprising polyesters, polyacrylic compounds and polyepoxides. It is also possible, however, to employ, as the component (A) containing OH groups, polyethers, polythioethers, polyacetals, polyester-amides, phenolic resins, amine resins and modification products thereof with polyfunctional alcohols, such as melamine, urea or thiourea resins; polyurethanes, polysulfonamides, cellulose esters and ethers, partially saponified homopolymers and copolymers of vinyl esters, acetalized polyvinyl alcohols or the like.

Suitable polyesters are the known and commercially available, saturated or unsaturated polyesters, optionally modified by ether groups and/or monofunctional components, such as monohydric alcohols or monocarboxylic acids, for example oil-modified polyesters or polyesters in the form of alkyd resins and also polyesters containing cycloaliphatic and/or aromatic constituents. In general, they have an acid number not higher than 15 and an OH number of 30–200, preferably 50–150.

The following are mentioned as fundamental constituents of the polyesters:

(a) aliphatic, optionally $\alpha,\beta$-ethylenically unsaturated, carboxylic acids, such as adipic acid, sebacic acid, maleic acid and fumaric acid and anhydrides thereof, insofar as the latter exist; cyclic polycarboxylic acids, such as phthalic acid and tetrahydro and hexahydro derivatives thereof, isophthalic acid, terephthalic acid or the like;

(b) polyhydric alcohols, such as ethylene glycol, the $C_{3-8}$-diols, oligomers thereof, cyclohexanediol, glycerol, trimethylolpropane or the like.

Suitable polyepoxides, which have an epoxy equivalent weight of 150 to 5,000, preferably 200 to 1,500, are, for example, those based on diphenylolpropane or diphenylolmethane and epichlorohydrin or adducts of other epoxides, such as ethylene oxide, propylene oxide, butylene oxide, trimethylene oxide, styrene oxide or the like, with polyhydric alcohols, amines or OH-alkylated phenols insofar as they still contain free OH groups, and also glycidyl esters or ethers which contain free OH groups and in which the optionally ethylenically unsaturated acid component has 3 to 12 carbon atoms.

Suitable polyacrylic compounds are homopolymers or copolymers of a hydroxyalkyl acrylate, in particular with acrylates having in each case up to 8 carbon atoms in the alkyl radical, acrylic acid, acrylonitrile, acrylamide, the corresponding methacrylic acid compounds, styrene, fumaric acid esters and maleic acid esters and, if appropriate, other copolymerizable monomers or the like, in each case on their own or as a mixture. In general, they have an average molecular weight of 800 to 20,000, preferably 1,000 to 15,000, especially 2,000 to 12,000, and an OH number of 50 to 200, preferably 80 to 160.

The boundaries between the low-molecular and the higher-molecular components (A) are fluid, however.

The products obtained using the low-molecular, in particular monomolecular and/or oligomeric, alcohols as a rule have melting points below 90° C. and in some cases are liquid.

The products prepared using the higher-molecular components (A), i.e., in particular, using the resinous or polymeric OH compounds, can have higher melting points.

The process according to the invention is advantageously carried out in the presence of a basic catalyst belonging to the group comprising tertiary amines and alkali compounds, for example alcoholates, such as potassium tert.-butylate and sodium methylate, or else sodium hydroxide or potassium hydroxide. Suitable amines are triethylamine, pyridine, dimethylaminopyridine, an N-alkylmorpholine, N-alkylpiperidines or an N-alkyldiethanolamine having in each case 1 to 10, preferably 1 to 5, carbon atoms in the alkyl group.

The proportion of catalyst can be 0.05 to 1, preferably 0.2 to 0.5, % by weight, relative to the total solids content of the reaction mixture.

If the component (A) containing OH groups is employed in the form of amine compounds, such as amine resins or aminoalcohols, the presence of a catalyst can be superfluous in certain cases.

It is also possible to carry out the reaction in the presence of an inert solvent, for example benzene, toluene, xylene, chlorinated hydrocarbons, such as methylene chloride, carbon tetrachloride, chloroform, dichloroethane, ethers, such as dimethoxyethane or dioxane, esters, such as ethyl, methyl or butyl acetate, or ketones, such as acetone, methyl ethyl ketone or methyl isobutyl ketone, in each case on their own or as a mixture. The esters, hydrocarbons and chlorinated hydrocarbons are preferred.

The proportions of the components (A) and (B) relative to one another are usually selected in a virtually stoichiometric ratio. If polymeric OH compounds are reacted as components (A), the number of OH groups will, as a rule, be taken as a guide. However, it is also possible to react only a fraction of the free OH groups, so that the OH groups which still remain are accessible to a further crosslinking reaction with the acylurethane groups, for example at a higher temperature. Thus, depending on the product desired, the ratio of OH group: acylurethane group of the formula (I) selected will, in general, be (0.5 to 1.3):1 to 1:(0.5 to 1.3), preferably (0.8 to 1):1 to 1:(0.8 to 1). If the products thus obtained contain, for practical purposes, only free acylurethane groups, they are suitable for reaction with further polyhydroxy compounds, as described, for example, in German Patent Application No. P34212949 ("Finely divided coating agent and the use thereof", filed on the same day).

The reaction temperature can be varied within a wide range, depending on the respective ratios and the nature and amount of the solvent and catalyst. If the reaction is carried out in the presence of a solvent, the temperature selected will, in general, be between room temperature and the temperature at the boiling point of the solvent, preferably up to 110° C.

If the reaction is carried out in the absence of a solvent, the temperature is, as a rule, between room temperature and 100° C.

The completion of the reaction, which lasts about 2 to 12 hours, depending on the reaction conditions, is determined by chromatography. The solvent is then removed, for example by distillation. The desired products are left as a residue in the form of oily or crystalline compounds, and can be processed without further purification.

The invention also relates to the use of the curing agents prepared in accordance with the invention, in combination with polyhydroxy compounds for the preparation of shaped articles and/or coatings, preferably as a mixture with a minor proportion of benzoin compounds, such as o-, m- or p-alkylbenzoins having up to 8, preferably 4, carbon atoms in the alkyl group, but especially benzoin itself. The proportion of benzoin compounds is generally 0.1 to 6, preferably 0.5 to 3, % by weight, relative to the total solids content of the mixture.

It has been found, surprisingly, that the products according to the invention—above all in the presence of benzoin compounds—lead to rapidly curing, high-grade shaped articles and coatings having very good flow and a fault-free surface, i.e. without the formation of corrugations, blisters or pores.

The component (B) can, for example, be reacted with a monomeric, polyhydric alcohol as the component (A) with complete reaction of the OH groups. Another compound containing OH groups is required to crosslink the compound thus formed. Accordingly, the products thus prepared can be employed as curing agents for compounds containing OH groups, which can be either low-molecular or high-molecular. If, for example, the starting material used is a monomeric or low-molecular alcohol as the component (A), a low-molecular curing agent is obtained. If the latter is employed to cure a high-molecular compound containing OH groups, for example a polyester or acrylic resin, this combination makes it possible to optimize the properties of the products formed therefrom, for example in the form of films and shaped articles, depending on the end use desired, for example as coating agents.

The imide component (B) can be reacted analogously with a polymer (A) containing OH groups, so that a polymeric curing agent is obtained, which can then be used, for example, to cure a monomeric polyhydroxy compound, in which case it is again possible to select the optimum combination.

By reacting a low-molecular component (A), it is also possible to prepare a low-molecular curing agent which is employed to cure a low-molecular polyhydroxy compound. This combination makes it possible to prepare, for example, products having a high crosslinking density, i.e. a high resistance to chemicals. On the other hand, in individual cases a high-molecular curing agent can also be used to cure an oligomeric or high-molecular compound containing OH groups. In this case, however, only a low crosslinking density is required, so that relatively rapid crosslinking takes place.

Another possible means consists in reacting partially a monomeric OH compound, for example a polyhydric alcohol, such as pentaerythritol, as the component (A) instead of the polymer. In this case too, fault-free crosslinking of the self-crosslinking system is obtained analogously to the embodiment first mentioned.

If used in accordance with the invention for coatings, the acylurethanes, preferably polyacylurethanes, or starting materials thereof having a melting point of at least 40° C., preferably at least 90° C., are advantageously employed in the form of powder or in the form of a dispersion or paste. The melting point of the products obtained in accordance with the invention is usually not higher than 240° C., preferably not higher than 180° C. If, on the other hand, the binder is in liquid form or has a melting point below 90° C., it is usually soluble in solvents and can, therefore, be applied as a coating in the form of a solution.

It has been found that the products obtained in accordance with the invention enable processing to be carried out reliably. It is also possible to apply a mixture of the starting component (A) and (B)—in which case excess OH groups must be present—and, if required, further customary additives for coatings, as a coating to a substrate and not to carry out the reaction according to the invention until baking, whereupon crosslinking takes place simultaneously. In this embodiment of the invention, the temperature can rise, as early as the mixing of the components, for example in the extruder, to at least 90° C., for example 100° to 120° C., for a short time without unintended premature crosslinking taking place. Nevertheless, the mixture thus treated can, surprisingly, be stored at room temperature for a period of several months without its reactivity being impaired. If the mixture is in powder form, agglomeration does not take place.

In another embodiment, the reaction according to the invention is first carried out, but only a fraction of the free OH groups in the component (A) is reacted. The products thus obtained are then processed further in accordance with processes known per se. They are, for example, applied to the substrate as a mixture with the additives customary for coating and are baked, whereupon the OH groups which are still free react with the acyl-urethane group with chain-lengthening and/or self-crosslinking. This embodiment makes it possible to impart certain properties of the polymer to the reaction product at the outset, for example to give the product good resistance to corrosion or the like by reacting a polyepoxide as the component (A). In this case too, the incompletely reacted products or mixtures thereof can be stored for months at room temperature, and a previous rise in temperature on mixing, for example in the extruder, does not have disadvantageous effects.

One embodiment of the invention envisages processing the products obtained in accordance with the invention further, as a mixture with further polyhydroxy compounds mentioned above, to give shaped articles or coatings, and carrying out crosslinking by heating, for example under baking conditions. This embodiment also ensures reliable processing even if mixing or extrusion temperatures of 100° C. to 120° C. are reached for a short period.

The advantageous flow properties of the coatings are due, above all, to the crosslinking reaction between the OH and acylurethane groups. The flow properties can be controlled, within certain limits, by the chain length of the component (B), for example through the alcohol groups. In addition to the excellent adhesion of the coatings on the substrate, they also exhibit good wetting of pigments, so that it is possible to produce coatings which are still relatively thin and still have an adequate hiding power and a satisfactory flow. This results in a considerable saving in materials. On the other hand, it is also possible to produce unpigmented coatings, for example by means of powder coating agents having a layer thickness of less than 30 $\mu$m, for example as low as 5 $\mu$m.

Since the compounds of the formula II and IV which are obtained in accordance with the invention contain mainly urethane groups, only compounds containing alcoholic groups are liberated on baking, so that this procedure proves to be particularly acceptable to the environment. Thus pollution of the environment does not take place, nor is it possible for any harmful substances to be precipitated and to cause problems in the processing appliances.

The layer thickness of the coatings obtained in accordance with the invention is usually not more than about 100 μm, or higher, but is preferably 40 to 60 μm. However, by virtue of the said advantageous properties of the coating agents, layer thicknesses of only about 5 μm still produce continuous coatings.

In addition to the components mentioned, the coating agents according to the invention can contain further customary additives, such as catalysts, pigments, fillers, leveling agents, wetting agents or the like, in each case on their own or as a mixture.

Polyacrylates, such as poly-n-butylacrylate, poly-2-ethylhexylacrylate and cellulose acetobutyrate are mentioned as examples of leveling agents.

If necessary, in order to use particularly low temperatures during curing, it is possible to have present at least one curing catalyst belonging to the group comprising sulfonic acid, such as p-toluenesulfonic acid or naphthalene-1,4-disulfonic acid; quaternary ammonium salts, such as tetrabutylammonium bromide, chloride and iodide; amine hydrochlorides, such as dimethylaniline hydrochloride, metal salts of organic acids, such as zinc naphthenate, cobalt naphthenate, dibutyltin dilaurate or lithium benzoate; metal alcoholates, for example alcoholates of titanium, vanadium and zirconium, and also coordination complexes thereof obtained by coordination of the alcoholates, such as acetylacetonate, ethyl acetoacetate and others, and also alkali metal compounds, such as lithium, sodium and potassium hydroxide, and salts, such as lithium chloride.

These catalysts are generally employed in a proportion of 0.01 to 5, preferably 0.1 to 0.5, % by weight, relative to the total solids content of the mixture.

Examples of pigments which can be used are titanium dioxide, iron oxides and carbon black. Suitable fillers are, inter alia, calcium carbonate and barium sulfate.

In order to prepare powder coating agents, pastes or dispersions, the acylurethanes obtained in accordance with the invention can be processed further by the processes customary for powder coating or for dispersions, such as are described, for example, in U.S. Pat. No. 4,383,055 and European Pat. No. 0,043,104.

Depending on the desired form of the coating agent, namely as a powder coating agent, paste or dispersion, various processes will be used. If, for example, it is desired to use the acrylurethanes or polyacylurethanes for a pulverulent coating agent, after all the components have been mixed the mixture can be extruded in a conventional, heatable extruder at a temperature which is increased for a short period, for example at a mass temperature of 100° C. to 120° C. Pulverization is effected by grinding. If appropriate, the comminution of the particles, when pastes or dispersions are prepared, can also be effected by wet grinding, in order to keep the temperature as low as possible. In this case it is preferable to employ water as the liquid phase.

If a dispersion is to be prepared, care should be taken that the products prepared in accordance with the invention, and also the other components in the mixture, are hydrophobic, in order to avoid undesirable preliminary reactions which can take place in systems partly soluble in water and can lead to problems. The coating agent is in this case homogenized, generally either in water or in a water-soluble binder, such as a polyester or reaction products thereof with oils which, for example, contain carboxyl groups and can subsequently be rendered water-soluble by means of compounds containing amino groups. The solids content of such a dispersion is generally 1 to 80, preferably 10–75, % by weight.

In order to prepare a powder coating agent or dispersions, the ground material is generally screened, and the particles having a particle size less than 120 μm are separated off. The particle size of the powder coating agent is thus up to 120 μm, preferably up to 90 μm and especially 30 to 50 μm. In the case of coating agents in the form of a suspension, the particle size is similarly not more than 120 μm, preferably not more than 15 μm and particularly not more than 5 μm.

The resulting powder is excellently stable on storage and does not agglomerate even when stored for months at temperatures up to 40° C., and still exhibits no tendency at all to crosslink when heated to 120° C.

The application of the coating agent, for example in liquid form, to a substrate is effected in a manner known per se by currentless application processes, such as spraying, dipping, flow coating or rolling (coil coating), or, particularly in the form of powder, by the electrostatic process of spraying onto metal parts, for example onto iron or aluminum sheet. In this case a coating agent, for example in liquid form, has a solids content of 20 to 80, preferably 40 to 75, % by weight.

If the binders obtained in accordance with the invention are to be applied as coatings in the form of a dispersion, it is preferable to use either the cataphoretic deposition process (electrophoretic powder coating) or the electrostatic process. In electro-dipcoating, the process is usually carried out in an aqueous liquor the substrate being connected as the cathode.

The coating agents can be applied, for example, to chemically pretreated or degreased, unprimed or primed metals, and also to glass and ceramics.

Of the applicatoon processes mentioned, the electrostatic spraying process and electro-dip coating, and also the rolling (coil coating), application processes are preferred.

The baking temperature of the coating agent is 140° to 300° C., preferably 150° to 200° C. and especially 160° to 180° C., the temperature being dependent on the baking time. The shorter the treatment time, the higher the temperature, and conversely. The maximum temperature of 300° C. is reached for a brief period, above all in the rolling process (coil coating), without disadvantageous effects on the properties of the coatings obtained. Fault-free surfaces are obtained by this process too. In individual cases the coated material can also be preheated at a temperature of 50° to 100° C. for a few minutes. As a rule, however, this is not necessary owing to the excellent curing properties of the coating agents according to the invention.

The formation of only cleavage products acceptable to the environment on baking and the excellent adhesion of the coatings to their substrate result in a substantial technical advance compared with the processes hitherto known.

If appropriate, monoacylurethanes can be used additionally in coating agents in order to reduce the crosslinking density as desired. However, they are then only employed in a minor proportion, i.e. up to 20, preferably up to 10, % by weight, relative to the polyurethanes. Although in most cases curing is desired and intended, it is not always necessary, depending on the end use of the products according to the invention, since the properties of the coating agent can be varied as required by selecting the compounds containing OH groups and the polycarboxylic acid ester R in formula I. Particular use will be made of this possible variant in the case of the monoacylurethanes.

Owing to their advantageous properties, the acylurethanes obtained in accordance with the invention can be used in a versatile manner, above all as binders for coatings on various substrates, such as metal, wood, plastics, glass and others, for example for weather-resistant coatings, such as exterior wall cladding, for window frames, metal sections and camping furniture, as top coatings for commercial vehicles, such as automobiles, agricultural machinery and motocycle coachwork, and for household equipment, such as refrigerators, electric kitchen ranges or the like.

The products obtained in accordance with the invention can, however, also be used in other ways, thanks to their great possibilities for variation. In addition to their use for shaped articles, including sheeting—for example in casting compositions—and/or for coatings, they can also be employed as binders in adhesives, for example for hot-melt or pressure-sensitive adhesives, and in putties, as binders for bonded adhesives, and in textile auxiliaries as sizing or lubricating agents or the like. In this case, use will be made, above all, of products having a syrupy to highly viscous consistency. A particularly good adhesion can be achieved by means of a possible interaction between the acylurethane groups and the polyester groups of the textiles. In addition, the acylurethanes can be used as binders for inorganic and organic fibers, such as cellulose, wood, glass, rock wool or plastics fibers, for example in the production of fiber nonwovens and particle boards and for impregnating textiles or the like.

In the tests and examples below, parts denote in each case parts by weight.

EXAMPLE 1

5.97 parts of N-n-butoxycarbonylsuccinimide (component B) were heated at 60° C. in 20 ml of chloroform together with 0.9 part of ethylene glycol (component A) and 0.05 part of potassium hydroxide. After 5 hours the mixture was cooled to 0° C., and the precipitate was filtered off with suction. Yield: 5.9 parts of a white powder, melting point 146° to 158° C.

EXAMPLE 2

5.1 parts of N-ethoxycarbonylsuccinimide in 15 parts of dimethoxyethane were heated to reflux temperature for 6 hours together with 1.6 parts of diethylene diglycol and 0.03 part of potassium t.-butylate; after the mixture had been cooled to room temperature, the precipitate was filtered off with suction and dried. Yield 4.3 parts of a white powder of melting point 126° to 138° C.

EXAMPLE 3

103 parts of N-ethoxycarbonylsuccinimide in 300 parts of dimethoxyethane were heated at 80° C. with 0.5 part of triethylamine and 27 parts of 1,1,1-trishydroxymethylpropane. After 12 hours, the solvent was distilled off at 50° C. under reduced pressure. The residue was 128 parts of a viscous oil.

EXAMPLE 4

3.5 parts of N-i-propylcarbonylsuccinimide were heated at 100° C. with 0.6 part of ethylene glycol and 0.2 part of triethylamine. After 8 hours, the mixture was cooled to room temperature and stirred to completion with 50 parts of ether. The precipitate was filtered off with suction and dried. Yield 3.4 parts of crystalline product of melting point 76° C.

The products obtained in accordance with Examples 1 to 4 are suitable for use as curing agents for any compound, in either solid or liquid form, containing OH groups, for example for polyesters, acrylic resins or the like. Resin/curing agent combinations of this type can be used in this manner for the preparation of shaped articles—for example from casting compositions too—or coatings.

Comparison substance V

The comparison substance used was a commercially available isophorone diisocyanate masked with ε-caprolactam, melting point 90° to 110° C., masked isocyanate groups 14%, free isocyanate groups 0.5%.

The use of the products obtained in accordance with the invention for coatings The products obtained in accordance with Examples 1 and 2 and also the comparison substance V were employed as curing agents for the production of coatings, together with the polyester I, which contained OH groups. The polyester I used here was a mixture of an oil-free, saturated polyester containing hydroxyl groups and having an OH number of 50, known under the trade name "Alftalat ® AN 739"=component A1, and a saturated polyester containing hydroxyl groups and having an OH number of 110, known under the trade name "Alftalat ® VAN 1242"=component A2.

Polyester I—OH number 70

Table 1 provides a summary of the ratios in which the polyacylurethanes prepared, in accordance with the invention, in Example. 1 and 2, the comparison substance V, the polyester and the other additives are employed when used as coatings.

TABLE 1

| Example | 1 | 2 | V |
|---|---|---|---|
| titanium dioxide | 300 | 300 | 300 |
| leveling agent (polyacrylate) | 30 | 30 | 30 |
| benzoin | 5 | 5 | 5 |
| curing agent from Example 1 | 149 | — | — |
| curing agent from Example 2 | — | 146 | — |
| comparison substance V | — | — | 181 |
| component A1 | 355 | 357 | 323 |
| component A2 | 162 | 162 | 161 |
| polyester I* | 517 | 519 | 484 |

*The numerical values for the polyester correspond to the total of the two grades of Alftalat mentioned previously.

Testing technical properties as coating agents

Tables 2 and 3 show the physical values of the coatings in Table 1 under various baking conditions. The values in Table 2 were obtained after curing for 20 minutes at 170° C. and those of Table 3 were obtained after curing for 15 minutes at 180° C. The impact testing was carried out as specified in ASTM D 2794-69. The values for flow were determined by visual testing, 0 denoting the best value and 5 denoting the worst value (DIN 53 230).

TABLE 2

Curing for 20 minutes at 170° C. (sheet iron, zinc phosphated)

| Example | 1 | 2 | V |
|---|---|---|---|
| Erichsen indentation, mm | 12.3 | 11 | 10 |
| impact testing (reverse) inch. pound | >100 | >100 | <20 |
| layer thickness, μm | 50 | 45 | 55 |
| gloss by Lange's method (60°) | 102 | 101 | 92 |
| flow | 1.5 | 1 | 2.5 |

TABLE 3

Curing for 15 minutes at 180° C. (sheet iron, zinc phosphated)

| Example | 1 | 2 | V |
|---|---|---|---|
| Erichsen indentation, mm | 11.5 | 11.6 | 10.8 |
| impact testing (reverse) inch. pound | >100 | >100 | 48 |
| layer thickness, μm | 50 | 55 | 55 |
| gloss by Lange's method (60°) | 101 | 100 | 92 |
| flow | 2 | 1.5 | 2.5 |

EXAMPLE 5a

Preparation of an epoxide-amine adduct (component A)

683 parts of an epoxy resin formed from diphenylolpropane (bisphenol A) and epichlorohydrin, having an epoxy equivalent weight of 480, were dissolved in 339 parts of dimethyl diglycol ether, and the solution was heated to 80° C. 50.4 parts of diethanolamine and 57.8 parts of diisopropylaminoethylamine were then added dropwise simultaneously, and the reaction mixture was kept at 80° C. for 3 hours. A clear, amber-colored resin solution was obtained.

EXAMPLE 5b 31 parts of N-ethoxycarbonylsuccinimide were added at room temperature to 300 parts of the above resin solution 5a, and the mixture was heated to 40° C. in the course of 30 minutes and then stirred for a further 2 hours at 60° C. After the mixture had been cooled to room temperature, 1.7 parts of lead octoate were added. A clear, amber-colored resin solution was obtained, in which the imide groups of the solid component are only partly esterified, and the latter still contains free OH groups.

The product obtained in accordance with Example 5 can also be used for the production of a priming coat by cataphoretic deposition. This is effected by dissolving the resulting resin solution in water, with the addition of a weak acid, such as acetic acid, and then carrying out the cataphoresis.

Comparison 5 V 31 parts of toluylene diisocyanate were dissolved in 24 parts of diethylene glycol dimethyl ether, 0.3 part of zinc acetylacetonate were added and 23 parts of 2-ethylhexanol were then added dropwise at 40° C. in the course of 2 hours. Stirring was continued at room temperature until the N=C=O value was 2.5%. The half-masked isocyanate thus prepared was added dropwise at 40° C. to 300 parts of the above resin solution 5a, and the mixture was kept at 40° C. until the N=C=O value had reached 0.2%. 2.6 parts of lead octoate were then added. A clear, amber-colored solution was obtained.

The use of the products according to Example 5b and comparison 5 V for coatings

The resin solution of Examples 5b and 5 V was diluted to approx. 50% with ethylene glycol monoethyl ether and was applied by a doctor blade to zinc phosphated iron sheets as a wet film of thickness 200 μm. The coating was then stoved at 150° to 180° C.

Testing technical properties as coating agents

The results of testing the technical properties as coating agents of the coatings baked at various temperatures can be seen from Table 4.

TABLE 4

| | Baking conditions | | | | | |
|---|---|---|---|---|---|---|
| | 150° C./ 20 min | | 160° C./ 20 min | | 180° C./ 20 min | |
| | Example or comparison | | | | | |
| | 5b | 5V | 5b | 5V | 5b | 5V |
| Erichsen indentation | 9.9 | 9.0 | 9.7 | 9.7 | 9.5 | 9.3 |
| impact testing (reverse) inch. pound | >160 | 48 | >160 | 100 | >160 | 140 |
| methyl ethyl ketone test (double wiping with an applied weight of 1 kg) | >100 | 30 | >100 | 50 | >100 | >100 |

Discussion of results

Re Tables 2 and 3

As can be seen from the values for Erichsen indentation and impact test, crosslinking takes place relatively early in the case of samples obtained in accordance with the invention, i.e. the required mechanical properties are reached, surprisingly, at a relatively low temperature and within short baking times. The advantage of the invention manifests itself above all in respect of comparison test V, in which, in particular, the value for the impact test is considerably lower than those of Examples 1 and 2. The products obtained in accordance with the invention also display a better gloss and flow than the comparison products.

Re Table 4

The coatings obtained using the resin solution according to Example 5b also display, even at low temperatures, excellent mechanical properties, as well as good resistance to chemicals (the methyl ethyl ketone test), which are not achieved by the comparison samples, as can be seen from the values at baking temperatures of 150° and 160° C. Thus an approximately equivalent crosslinking is only achieved at a temperature of 180° C. in the comparison test. In addition, all the products according to the invention have an excellent stability on storage for weeks and months.

We claim:

1. A process for the preparation of an acylurethane by reacting a urethane with compounds containing hydroxyl groups, which comprises reacting a hydroxy compound (A) with a urethane (B) in the form of an imide of the formula

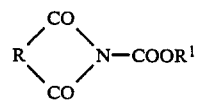    (I)

to give an acylurethane containing at least one grouping of the formula —CO—R—CO—NH—COOR$^1$ (II), in which formulae R denotes the hydrocarbon radical of an optionally α,β-ethylenically unsaturated, aliphatic, cycloaliphatic or aromatic dicarboxylic acid or endomethylene derivatives thereof, in each case having 2 to 10 carbon atoms, and $R^1$ denotes alkyl, alkoxy or alkoxyalkyl having in each case 1 to 16 carbon atoms in the alkyl group, cycloalkyl having 3 to 10 carbon atoms or benzyl.

2. The process as claimed in claim 1, wherein the reaction of the component (B) with a component (A) containing OH groups is carried out in such a way that only a fraction of the OH groups in the component (A) is reacted.

3. The process as claimed in claim 1, wherein the component (A) is reacted in the form of at least one compound selected from the group consisting of polyhydric, monomeric and oligomeric alcohol, polyester, polyacrylic compound and polyepoxide.

4. The process as claimed in claim 1, wherein the component (A) empolyed is a polyester having an OH number of 30 to 200, en eposy resin having an epoxy equivalent weight of 150 to 5,000 or a polyacrylic compound having an average molecular weight of 800 to 20,000 and an OH number of 50 to 200.

5. The process as claimed in claim 1, wherein the ratio of the OH groups in the component (A) to the acylurethane groups in the component (B) is (0.5 to 1.3):1 to 1:(0.5 to 1.3).

6. The process as claimed in claim 1, wherein the reaction is carried out in the presence of a basic catalyst selected from the group consisting of tertiary amine and alkali compound in the presence or absence of a solvent.

7. The process as claimed in claim 1, wherein the proportion of the catalyst is 0.05 to 1% by weight, relative to the total solids content of the reaction mixture.

8. The process as claimed in claim 1, wherein the component (B) is reacted in the form of a compound of the formula $$\begin{matrix} CH_2-CO \\ | \quad\quad\quad >N-COOR^1 \\ CH_2-CO \end{matrix} \quad (III)$$

in which $R^1$ denotes alkyl having 1 to 12 carbon atoms, with the component (A) in the form of a diol to give product of the formula $$R^2-(OOC-CH_2-CH_2-CO-NH-COOR^1)_2 \quad (IV)$$

in which $R^1$ has the above meaning and $R^2$ denotes an alkylene radical having 2 to 10 carbon atoms.

9. A coating agent based on acylurethanes prepared by the process as claimed in claim 1 and further customary additives in the presence or absence of polyhydroxy compounds.

10. A coating agent as claimed in claim 9, wherein compounds selected from the group consisting of catalysts, pigments, fillers, leveling agents and wetting agents are present as further additives.

11. A coating agent as claimed in claim 9 in the form of powder or as a paste, dispersion or solution.

12. A coating agent as claimed in claim 9, wherein the acylurethane is employed together with benzoin, o-, m- or P-alkyl substitution products of benzion, or a mixture thereof.

13. A coating agent as claimed in claim 9 which is self-crosslinkable.

14. A coating agent as claimed in claim 9 for the production of shaped articles.

* * * * *